United States Patent

[11] 3,611,152

[72] Inventors Yasuhide Sakai
Kawasaki-shi;
Yoshinori Takagi, Yokohama; Masahiro Watanabe, Yokohama, all of Japan

[21] Appl. No. 744,465
[22] Filed July 12, 1968
[45] Patented Oct. 5, 1971
[73] Assignee Matsushita Electric Industrial Co., Ltd. Kadoma-shi, Osaka, Japan
[32] Priority July 25, 1967, July 25, 1967, Apr. 3, 1968, Apr. 3, 1968, Apr. 3, 1968, Apr. 3, 1968, Apr. 5, 1968, Apr. 4, 1968
[33] Japan
[31] 42-48280, 42-48279, 43-22489, 43-22494, 43-22495, 43-22492, 43-23010 and 43-23036

[54] STABILIZED AUTOMATIC TUNING RECEIVER
9 Claims, 18 Drawing Figs.

[52] U.S. Cl. 325/421, 325/422
[51] Int. Cl. H04b 1/16
[50] Field of Search 325/418, 416, 417, 420, 421, 422

[56] References Cited

UNITED STATES PATENTS

| | | | |
|---|---|---|---|
| 3,163,822 | 12/1964 | Carlson | 325/421 |
| 3,331,025 | 7/1967 | Rameau | 325/419 |
| 3,473,128 | 10/1969 | Kiser | 325/422 |

*Primary Examiner*—Robert L. Griffin
*Assistant Examiner*—Kenneth W. Weinstein
*Attorney*—Stevens, Davis, Miller & Mosher

ABSTRACT: An automatic tuning device using pure electrically variable reactance elements as tuning elements for an antenna-tuning circuit, high-frequency tuning circuit, local oscillator circuit and the like in a receiver, said automatic tuning device being capable of positively maintaining the receiver tuned to a received frequency even if a field intensity varies or becomes extinct and effecting correction control to provide accurate tuning constants concurrently with signal selection during the automatic signal-seeking operation.

STABILIZED AUTOMATIC TUNING RECEIVER

This invention relates to an automatic tuning device using pure electrically variable reactance elements as tuning elements for an antenna-tuning circuit, high-frequency circuit, local oscillator circuit and the like in a receiver, said automatic tuning device being capable of positively maintaining the receiver tuned to a received frequency even if a field intensity varies or a radio wave becomes extinct, effecting automatic correction control to provide accurate tuning constants concurrently with signal selection during the automatic signal-seeking operation, and producing a function to prevent the tuned frequency from being deviated due to strong noise.

In the conventional automatic tuning type receivers, it is the usual practice that the locking of a tuned frequency when the field intensity becomes extinct is effected by means of a electronic memory such as charge storage by a capacitor or the like. With such electronic memory, however, it is impossible to maintain a constant voltage for a long time, and therefore the tuned frequency is gradually deviated as time lapses, thus resulting in poor reliability.

Accordingly, it is a primary object of this invention to provide an automatic tuning device utilizing fixed LC constants representing the center value of a frequency discriminating circuit a narrow band-pass filter or the like instead of a voltage memory to thereby positively maintain the receiver tuned to a received frequency.

Another object of this invention is to provide an automatic tuning device which is capable of effecting correction control to provide accurate tuning constants concurrently with the selection of a signal in the broadcast band.

Still another object of this invention is to provide an automatic tuning device which is well suited to the use with a car radio set or the like and can easily be manufactured.

Other objects, features and advantages of the present invention will become apparent form the following description taken in conjunction with the accompanying drawings, in which.

Figure 12:
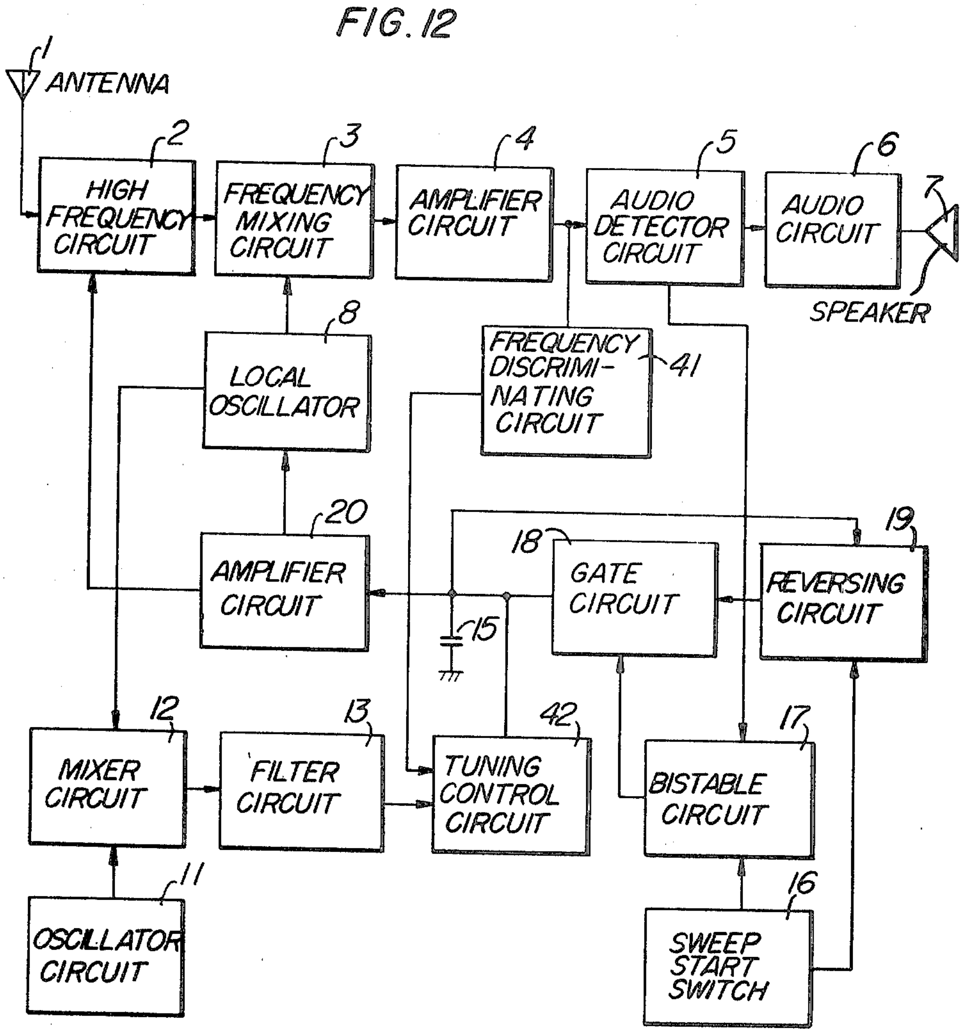
Figure 13:
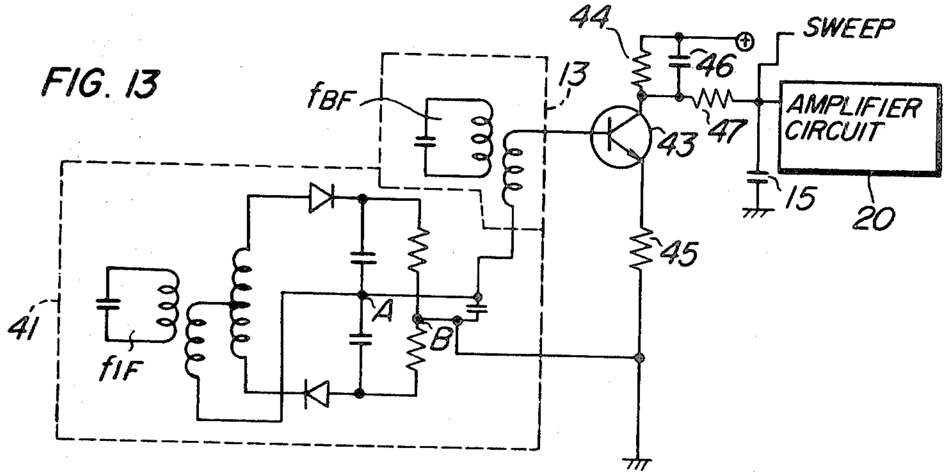
Figure 14:
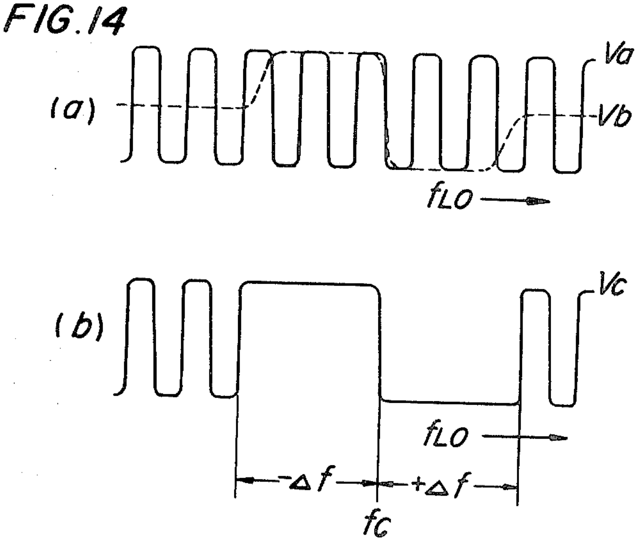
Figure 15:
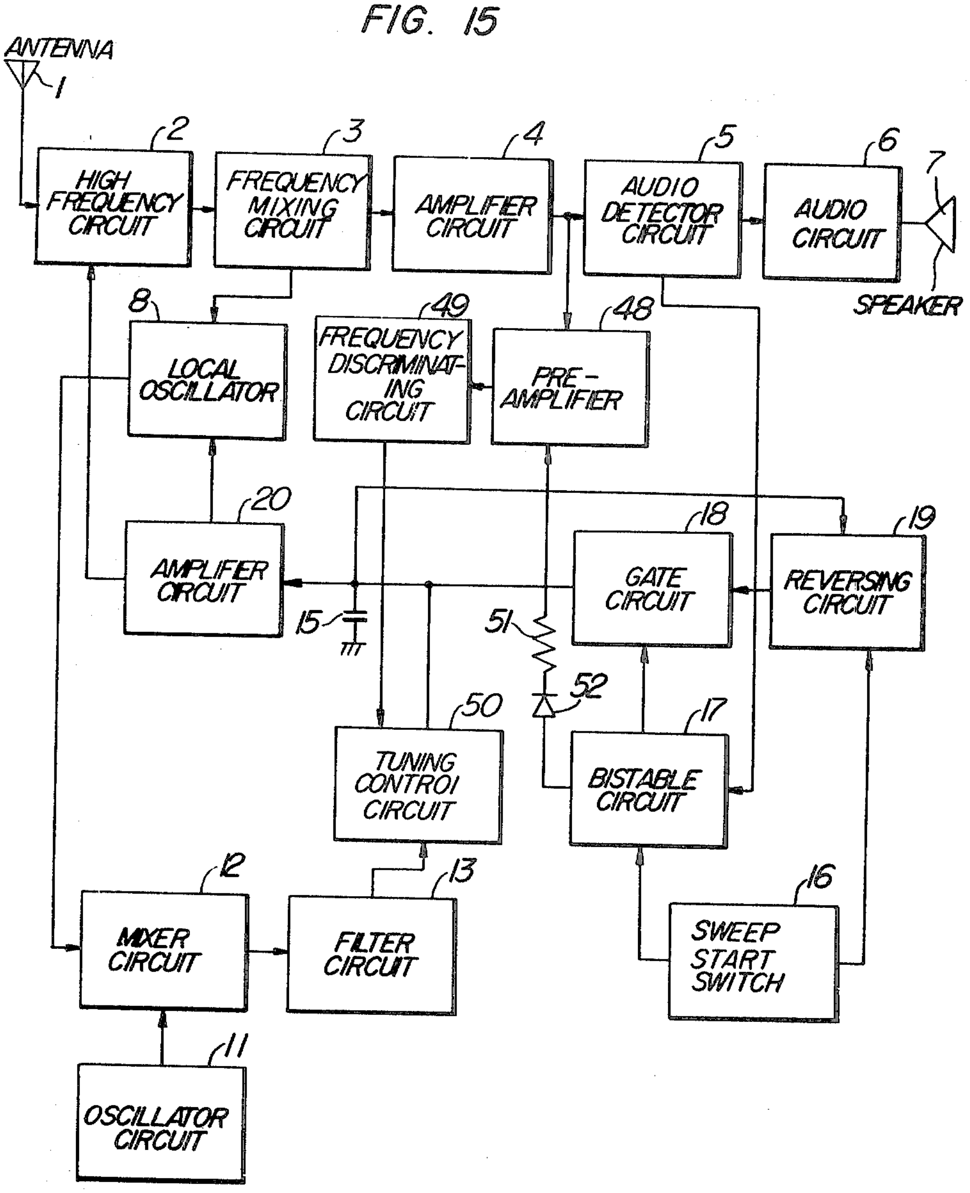
Figure 16:
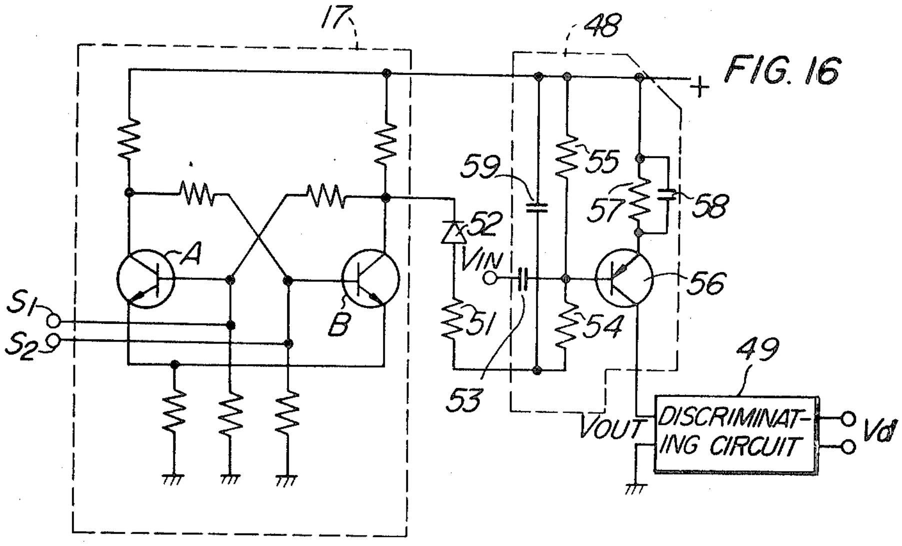
Figure 17:
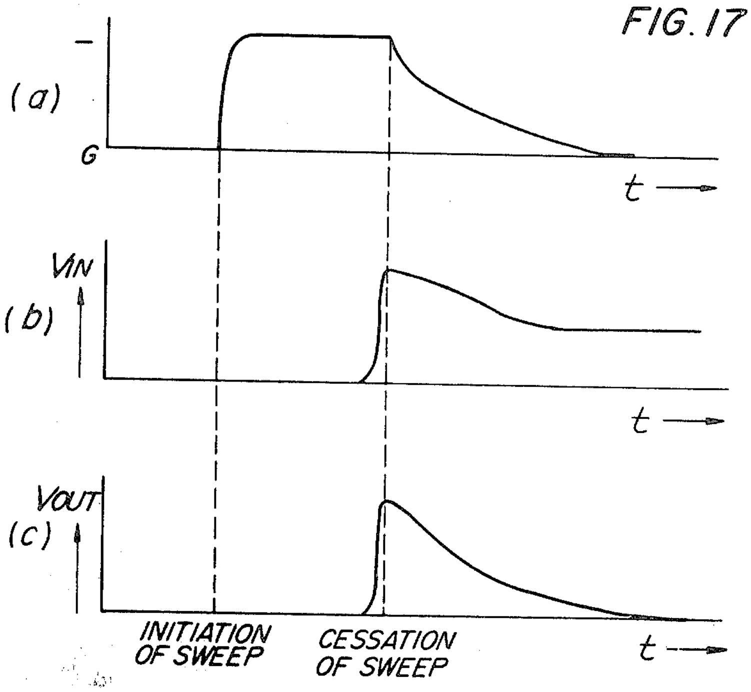

FIGS. 13 and 16 are circuit diagrams showing the main portions of FIGS. 12 and 15, respectively; and FIGS. 14 and 17 are waveform views showing the operations of FIGS. 13 and 16, respectively.

Description will now be made of a first embodiment of the present invention, with reference to FIG. 1, wherein the reference numeral 1 represents an antenna, 2 a high-frequency circuit using a variable reactance element as tuning element for an antenna tuning circuit and high-frequency tuning circuit, 3 a frequency mixing circuit, 4 and intermediate-frequency amplifier circuit, 5 and audio detector circuit, 6 and audio circuit, 7 a speaker, 8 a local oscillator circuit using a variable reactance element as tuning element, and 9 a narrow-band filter circuit of which the center frequency of passband is the same as the intermediate frequency. The reference numeral 10 indicates a detector circuit, and 11 a reference frequency oscillator circuit which includes a fixed basic frequency oscillator circuit and a harmonics-generating circuit. The reference numeral 12 denotes a mixer circuit, 13 a fixed band-pass filter, and 14 an automatic frequency control circuit, which may be a combination of a frequency-discriminating circuit and a DC control circuit. The reference numeral 15 represents a capacitor the voltage across which is used as reference for setting the tuning constants of each variable reactance element, and 16 a sweep start switch adapted for initiating the frequency sweep for signal seeking either in the higher transmission frequency direction of the lower direction. The reference numeral 17 denotes a sweeping bistable circuit which is set to the sweeping state by the sweep start switch 16 and reversed to the nonsweeping state by the output of the detector circuit 10, 18 a gate circuit for passing or interrupting input current for frequency sweep from an an automatic sweep-reversing circuit 19 to he capacitor 15 in accordance with instructions by the sweeping bistable circuit 17, and 20 a buffer amplifier supplying to each variable reactance element a voltage or current corresponding to the voltage across the capacitor 15.

Description will now be made of the operation of the present embodiment. By depressing the sweep start switch 16, the sweeping bistable circuit 17 is set to the sweeping state so that the gate circuit 18 is opened. Simultaneously, the automatic sweep-reversing circuit 19 is set in a desired direction, either charging direction or discharging direction, and the output thereof is supplied to the capacitor 15 through the gate circuit 18 to initiate the sweep of the charges at the capacitor 15 either in the charging direction or the discharging direction. The automatic sweep-reversing circuit 19 is constituted by a Schmitt circuit or the like exhibiting hysteresis, which operates as a bistable circuit capable of assuming two different states between the two levels of the voltage across the capacitor 15 and being optionally set in either of the charging and discharging directions by means of the sweep start switch 16 and automatically reversed at the upper and lower limits of said two levels.

The two levels described above are set to voltage levels corresponding to the upper and lower limits of the required frequency sweep range.

When the voltage across the capacitor 15 is swept in either the charging direction or the discharging direction, there occurs a sweep of the current or voltage applied to each variable reactance tuning element through the buffer amplifier circuit 20. Thus, the frequency tuned in the receiving circuit sweeps in a desired direction.

When a transmissive (broadcast) signal is received in the receiving circuit, an intermediate-frequency output having passed through the narrow band-pass filter circuit 9 at the center of the tuning point is supplied to the detector 10, which in turn provides a detection output by which the sweeping bistable circuit 17 is reversed to the nonsweeping state. Upon the reversal of the sweeping bistable circuit 17 to the nonsweeping state, the gate circuit 18 is closed, so that the voltage sweep input to the capacitor 15 resulting from the charging input or discharging input provided by the automatic sweep-reversing circuit 19 is interrupted. As a result, change of the tuning constants of each tuning circuit is interrupted, thus ceasing the frequency sweep of the receiving circuit.

Assume that the automatic frequency control circuit 14 is not provided. Then, the frequency tuned by the receiving circuit tends to gradually change due to variations in the circuit constants stemming from leakage of the charges at the capacitor 15 and temperature variations. For this reason, it is essential to provide the automatic frequency control circuit 14. In case it is desired that the correct tuned frequency be maintained even when an incoming radio signal becomes extinct, the automatic frequency control becomes meaningless if its correction control be effected with the received radio signal as reference. A method of such automatic frequency control is to maintain the oscillation frequency of the local oscillator circuit and the other tuning constants in a fixed relationship to that of the fixed frequency oscillator contained as a basic frequency oscillator in the receiver.

Assume now that the output frequency of the comparison-frequency oscillator circuit 11 is $n \times f_o$ ($n=1, 2, 3, \ldots\ldots\ldots \infty$). The output frequency components of the reference-frequency oscillator circuit 11 are innumerable and occur at intervals corresponding to $f_0$. The frequency components of an output obtained by mixing the output of the reference-frequency oscillator circuit 11 with the local oscillator frequency $f_{LO}$, $f_{LO}-n\times f_o$ and $n\times f-f_{LO}$, are also innumerable and occur at a density twice as high as that of the output frequency components of the reference-frequency oscillator circuit 11. Each of the frequency components of the mixture output is changed by an amount of $\Delta f_{LO}$ which is a change of the local oscillator frequency $f_{LO}$ when the latter changes, if the frequency $f_o$ of the reference-frequency oscillator circuit 11 is stable. Thus, the mixture output frequency can be utilized for the purpose of frequency control with respect to the local oscillator circuit 8 and other tuning circuits.

Naming the center value of band-pass filter, $f_c$ and the difference of nearest mixture output frequency from $f_c$, $\Delta f_c$, if $f_{LO}$ is controlled by the output of the automatic frequency control circuit 14 so as to be decreased for $\Delta f_c>0$ and increased for $\Delta f_c<0$, the output of the automatic frequency control circuit 14 serves to effect such a control as to "attract" the local oscillator frequency $f_{LO}$ to the constant frequency $nf_o+f_c$ (hereinafter referred to as attracting control) for the mixture output $n\times f_o<f_{LO}$. This is because $f_c$ can be selected to meet the following relation so that $\Delta f_c$ becomes equal to $\Delta f_{LO}$ or $\Delta f_c\times\Delta f_{LO}$. $f_{LO}+\Delta f_{LO}-n\times f_o\times f_c+\Delta f_c$ On the other hand for the mixture output of $n\times f_o>f_{LO}$, $\Delta f_c\times-\Delta f_{LO}$ from $n\times f_o-(f_{LO}+\Delta f_{LO})=f_c+\Delta f_c$ and thus the automatic control circuit 14 then serves to effect such a control as to "repel" the local oscillator frequency $f_{LO}$ from the constant frequency $nf_o+f_c$ (hereinafter referred to as repelling control).

The foregoing absorption and repulsion-controls never fail to alternatively occur as the sweep of the local oscillator frequency proceeds, and thus it is possible to adopt a desired type of automatic frequency control system by suitably selecting $f_o$ and $f_c$. In general, the relation between $f_c$ and $f_o$ satisfies the equation $f_c\times f_o(n\pm 1/4)$.

Description will be made, by way of example of the case where $f_o$ is selected to 10 kc. and $f_c$ to 12.5 kc. in a medium wave band receiver in which the intermediate frequency $f_{IF}$ is set to 262.5 kc., in view of the fact that the broadcasting frequency is set to integer times of 10 kc.

FIG. 2(A) shows a local oscillator frequency with a constant amplitude, wherein frequency is indicated on the horizontal axis and absolute values of frequency variations correspond to those in the succeeding figures, FIG. 2(B) shows the frequency spectra of the output of the reference-frequency oscillator circuit 11, which are arranged at intervals of 10 kc., and FIG. 2(C) shows spectra occurring when a mixture output resulting from a combination of $f_{LO}>n\times 10$ kc. is passed through the band-pass filter 13 with $f_c$=12.5 kc. and which are arranged at intervals of 10 kc. at positions by 2.5 kc. higher than those of FIG. 2(B) (referred to as beat *a* hereinafter).

FIG. 2(D) illustrates spectra occurring when an output of the filter circuit 13 resulting from a combination of $f_{LO}<n\times 10$ kc. is passed through the band-pass filter with $f_c$=12.5 kc. and which are arranged at intervals of 10 kc. at positions by 2.5 kc. lower than those of FIG. 2(B) at positions by 2.5 kc lower than those of FIG. 2(B) (referred to as beat *b* ). The beats *a* and *b* never fail to alternately occur as the sweep of the local oscillator frequency proceeds.

Figure 2:
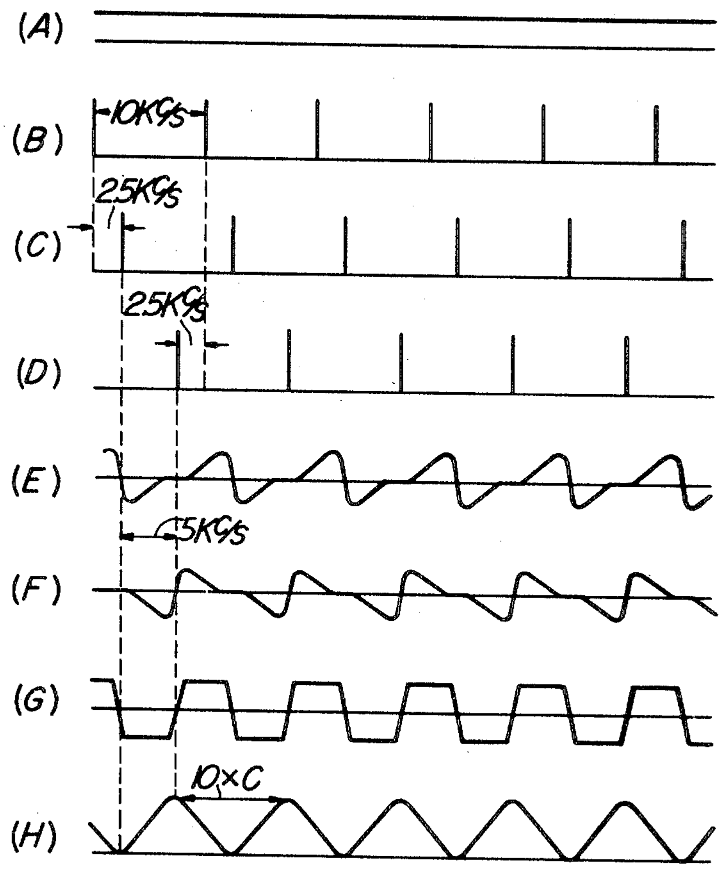
FIG. 2 is a view showing frequency spectra and outputs at various positions in the automatic tuning device.

If the automatic frequency control circuit 14 is so arranged that the beat *a* produces constrained-control with respect to the normal local oscillation frequency, and it is assumed that the output of the automatic frequency control circuit 14 based on the beat *a* is shown at (E) in FIG. 2, then the output of the circuit 14 based on the beat *b* becomes as shown at (F) in FIG. 2, and the actual output of the automatic frequency control circuit 14 becomes as shown at (G) in FIG. 2, occurring at a cyclic period of 10 kc. due to the coexistence of the beats *a* and *b*. That is, the automatic frequency control circuit 14 effects attraction-control with respect to the local oscillator frequency at a position where a signal of 12.5 kc. resulting from the beat *a* occurs in the mixer circuit 12, and the oscillation frequency of the local oscillator circuit 8 is of such a value that the intermediate frequency becomes exactly 262.5 kc.

The corresponding received frequency becomes exactly *n* times 10 kc. ($n$=1, 2, 3,...), and conforms to the frequency position where the broadcasting frequency is positioned. The local oscillator frequency subjected to repulsion-control by the beat *b* is located at a position where the intermediate frequency with respect to the broadcast wave becomes 262.5 kc.±5 kc., since the beats *a* and *b* alternately occur side by side at uniform intervals at every other 5 kc. and thus the corresponding received frequency is positioned intermediate between the frequency positions represented by $n\times 10$ kc. where broadcast waves are located.

FIG. 2(H) shows the potential determining the local oscillator frequency when the automatic frequency control is effected. From this, it will be seen that the local oscillation frequency is always attraction-controlled to the lowest potential position so long as no external force is imparted thereto. Furthermore, it will also be seen that the automatic frequency control circuit in 14 in FIG. 1 causes the receiver to be always attracted to a position where it is completely tuned to a transmissive frequency, whether a received signal is present or absent, so that the tuning of the receiver is not switched to an other transmissive signal so long as no special external force is imparted thereto. No such phenomenon as detuning due to incoming noise occurs since no input signal is used for the purpose of maintaining the tuned state. Furthermore, tracking is made to automatically maintain the tuned state in case the constants of the tuning elements are varied with temperature and the constants of the circuit supplying a current or voltage to each variable reactance element are varied with temperature, so that the tuning to a received signal frequency is maintained irrespective of the state of the incoming radio wave, so long as the power source is provided.

Figure 1:
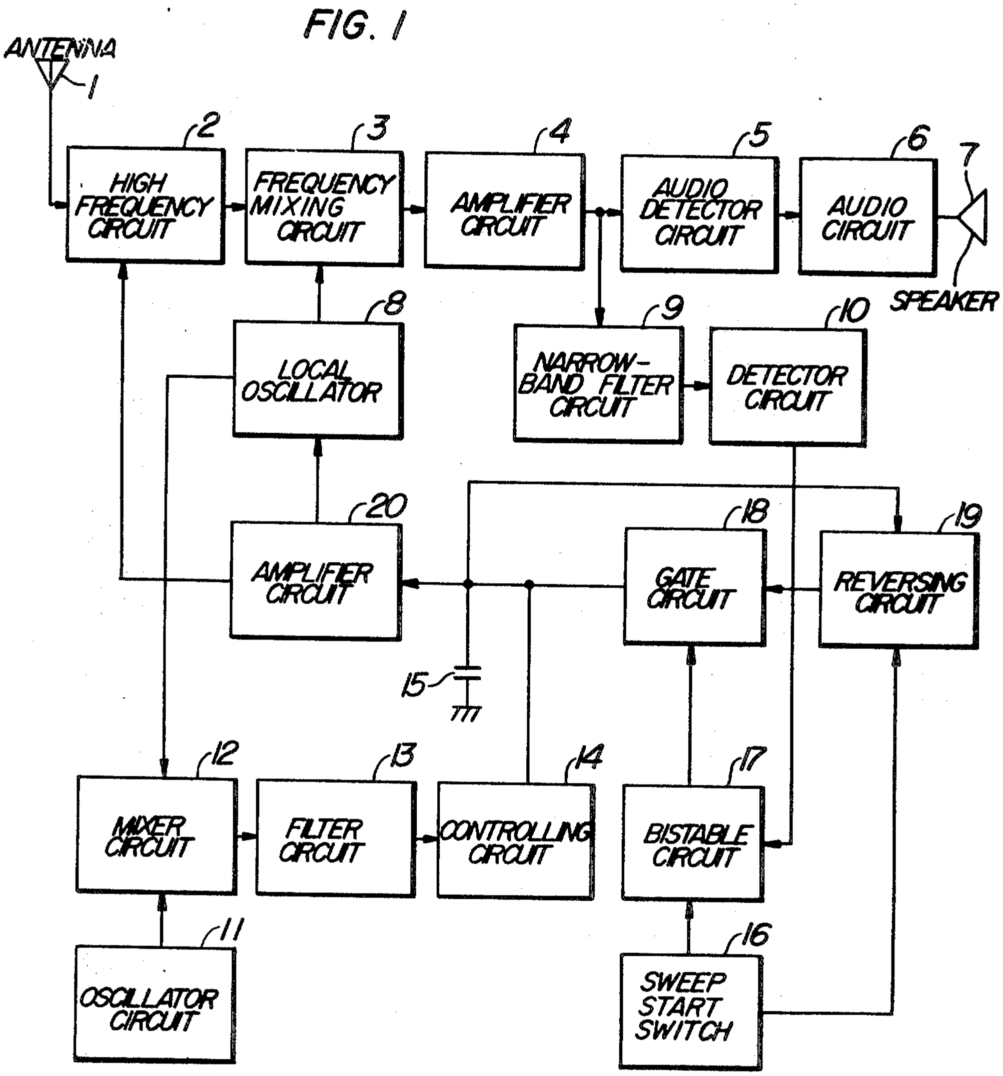
FIG. 1 is a block diagram showing the automatic tuning device according to an embodiment of this invention.

In an attempt to tune in an other station by again depressing the sweep start switch 16 in FIG. 1, the input current for sweep from the automatic sweep-reversing circuit 19 is imparted to the capacitor 15 through the gate circuit 18. Since the input current for sweep from the automatic sweep-reversing circuit 19 is set to be much stronger than the control input from the automatic frequency control circuit 14, it goes beyond a peak of the potential shown in FIG. 2(H) to easily effect the frequency sweep and falls in the nearest valley of the potential simultaneously when the gate circuit 18 is closed upon arrival of a signal frequency.

In the case of the foregoing example, the lowest points of the potential valleys are so selected as to correspond to the tuning positions for transmissive signals spaced apart from each other by 10 kc., so that the output of the detector circuit 10 for closing the gate circuit 18 even though differs slightly in time, the tuning point of the receiving circuit is drawn to the optimum tuning point so long as the time difference does not exceed ±5 kc. when it is converted into frequency. In the above arrangement, the narrow-band filter 9 tuned to the center of the intermediate frequency is provided in front of the detector circuit 10 to thereby prevent the converted frequency error corresponding to the time difference of the output of the detector circuit 10 from accurate timing exceeding ±5 kc.

As described above, in accordance with the present invention, a number of fixed reference frequencies are mixed with the local oscillator frequency, the resulting output is passed through the fixed band-pass filter to be maintained at a constant controlled frequency, and the respective tuning constants of the aforementioned receiver are controlled to maintain the received frequency at a constant value.

Thus, the tuning to the received frequency can be positively maintained even if a field intensity changes or becomes extinct, and in addition the correction control can be effected to provide accurate tuning constants upon completion of channel selection.

Figure 3:
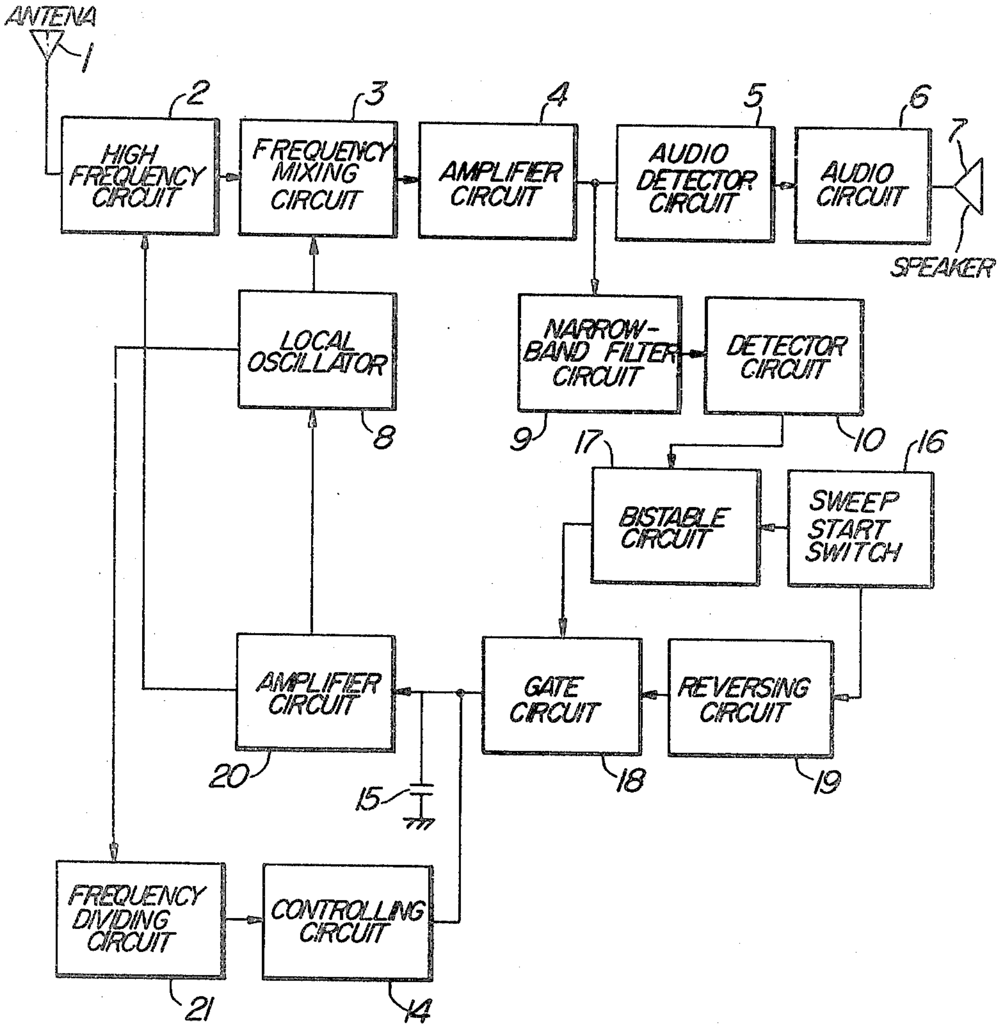
FIG. 3 to 8, 12, 15 and 18 are block diagrams showing the automatic tuning devices according to embodiments of the present invention, respectively.

FIG. 3 shows a second embodiment of the present invention. Elements indicated at 1 to 10 and 14 to 20 are similar to those indicated at 1 to 10 and 14 to 20 in FIG. 1, and therefore description thereof will be omitted. Referring to FIG. 3, the reference numeral 21 represents a frequency-dividing circuit for dividing into substantially 10 kc./s. an input having a frequency which is substantially near an integer times 10 kc./s. The frequency divider circuit 21 has a variable demultiplication ratio, and it is constituted by a 10 kc.-tuning tuning circuit having a negative resistance. Upon application to the frequency-dividing circuit 21 of an input having a frequency which is near an integer times 10 kc., the circuit 21 provides an output having a frequency of near 10 k., where dividing signal has intensity. The relationship between the input frequency (frequency of the local oscillator) and the output is as indicated in the following table, for example.

| Local oscillation frequency | Divided frequency | |
|---|---|---|
| 1,108 | 8 | |
| 1,110 | 10 | Maximum output |
| 1,112 | 12 | |
| 1,118 | 8 | |
| 1,120 | 10 | Maximum output |
| 1,122 | 12 | |

Next, description will be made of the operation of this embodiment.

In order to start a sweep, for signal seeking the sweep start switch 16 is depressed to set the sweeping bistable circuit 17 to the sweeping state, whereupon the capacitor 15 is charged or discharged through the gate 18. The voltage across the capacitor 15 which is the resulting sweep signal is supplied in the form of voltage or current to the variable reactance elements serving as tuning elements in the high-frequency amplifier circuit 2 and local oscillator circuit 8 through the buffer amplifier 20. Thus, the frequency sweep is initiated. When a received field becomes strong, a signal passing through the narrow-band filter 9 of which the center value corresponds substantially to the center of the intermediate frequency is suddenly increased so that the gate 18 is closed by the instruction of the sweeping bistable circuit 17 which is reversed by the detection output of the detector 10. Consequently, the sweep input to the capacitor 15 vanishes, and the voltage across the capacitor 15 is controlled by the output of the frequency discriminator 14. More specifically, part of the output of the local oscillator circuit 8 is supplied to the frequency divider circuit 21 which is adapted to divide into near 10 kc. all the inputs having a frequency which is near an integer times 10 kc./s., so that the local oscillator frequency is close to a frequency which is an integer times 10 kc./s. when the received field becomes strong during the sweeping operation. Thus, an output frequency (in the vicinity of 10 kc.) within the range that can be effectively controlled by the frequency discriminator 14 is available from the frequency-dividing circuit 21. That is, in the tuned state, the output of the frequency-dividing circuit 21 has a frequency of 10 kc./s. The output of the frequency discriminator 14 controls the voltage across the capacitor 15 whereby the tuning circuit is controlled to be drawn to a tuning point where the frequency of the output of the frequency divider circuit 21 becomes exactly 10 kc./s. or an accurate tuning point for the received signal. If the sweep start switch 16 is depressed again, then the sweeping bistable circuit 17 is set to the sweeping state and gate 18 is opened so that the capacitor 15 is charged or discharged by satisfactory stronger sweep input current than controlling input from the frequency discriminator 14. Thus, the sweep becomes possible. In case the input field attenuates or vanishes when the receiver is in the tuned state to be ready for reception, the voltage across the capacitor 15 is controlled by the frequency divider circuit 21 and frequency discriminator 14 with the output of the local oscillator circuit 8 as reference. In this way, it is possible to wait for recovery of the input field while the receiving circuit is maintained in the tuned state, and thus detuning will never be caused. It is also possible that the circuits providing an input current to the capacitor 15 may be switched in accordance with the output of the detector circuit 10 so that such input current is provided from the sweeping bistable circuit 17 and the frequency discriminator 14 during the sweeping operation and the reception-tuning controlling operation respectively. To this end, some circuits are additionally provided, whereby ideal control can be achieved.

Figure 4:
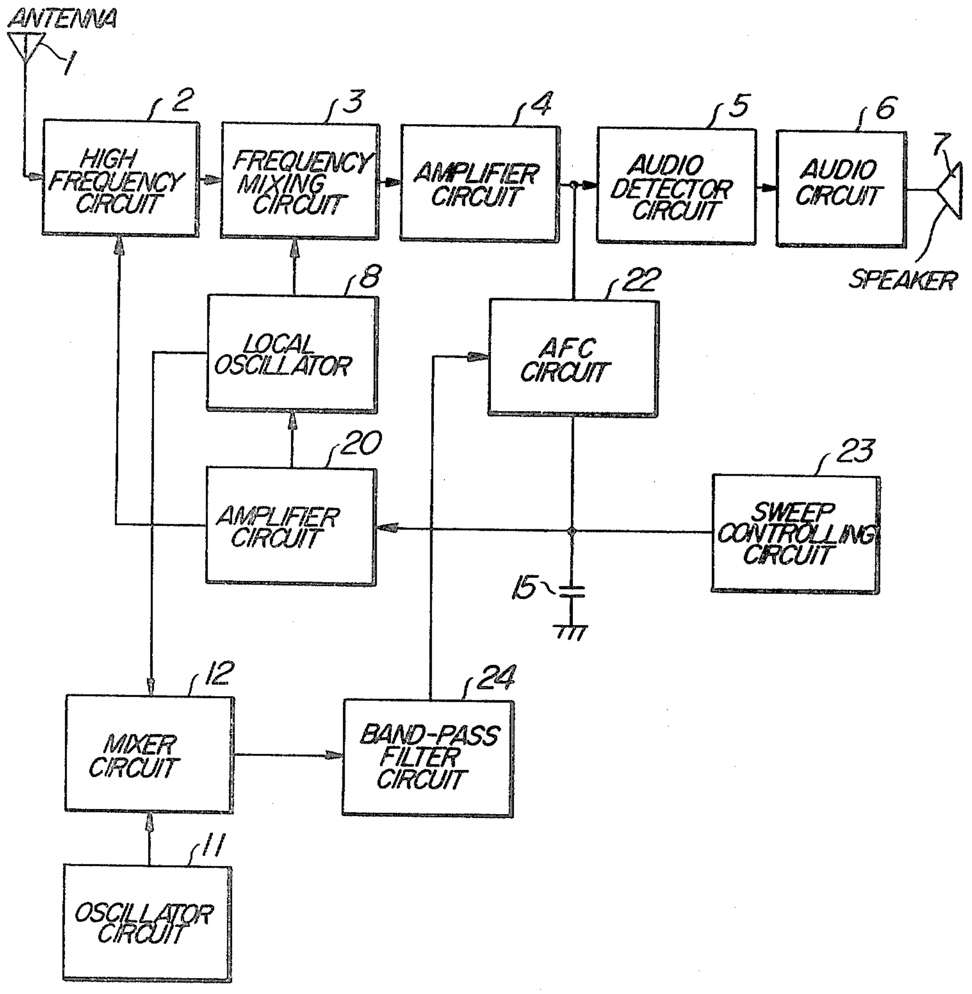

FIG. 4 shows a third embodiment of this invention. In FIG. 4, elements indicated at 1 to 8 and 11, 12, 15 and 20 are similar to those indicated by 1 to 8, 11, 12, 15 and 20 in FIG. 1, and therefore description of these elements will be omitted. Referring to FIG. 4, the reference numeral 22 represents an AFC circuit to which the intermediate-frequency signal is supplied as driving input, 23 a sweep-controlling circuit which is adapted for sweep-controlling capacitor in any desired direction, either the charging direction or the discharging direction, with the sweep start switch depressed, and stopping the sweep control upon arrival of a received signal. The reference numeral 24 denotes a fixed band-pass filter which serves to extract only that one of innumerable mixture frequency outputs occurring at the output of the mixer circuit which has a frequency component equal to the center value of the AFC circuit 22.

The operation of this embodiment will now be described.

A multiplicity of fixed reference oscillation frequencies from the reference-frequency oscillator circuit 11 and the local oscillator frequency of the local oscillator circuit 8 are mixed in the mixer circuit 12. Here, the following relation is established between the beats produced in the mixer circuit 12 $f_c = M \times f_o \pm f_{IF}$ ($M=0, 1, 2, 3, \ldots$) where $f_c$ is the control frequency used for the tuned frequency locking control, $f_{IF}$ the intermediate frequency and $f_o$ the fixed basic oscillation frequency in the reference-frequency oscillator circuit 11. ($M$ may be optionally selected.)

For $M=0$, $f_c = f_{IF}$. Thus, a frequency equal to the intermediate frequency is used as the tuned frequency-locking control frequency.

Consequently, the automatic frequency control circuit used for the tuned frequency-locking control and the tuning correcting AFC circuit for which the intermediate frequency output serves as driving source can be used in common, so that two functions, namely, ordinary AFC control and tuned frequency-locking control can be simultaneously achieved by imparting to the AFC circuit 22 the two signals having the tuning locking control frequency and the intermediate frequency.

Figure 5:
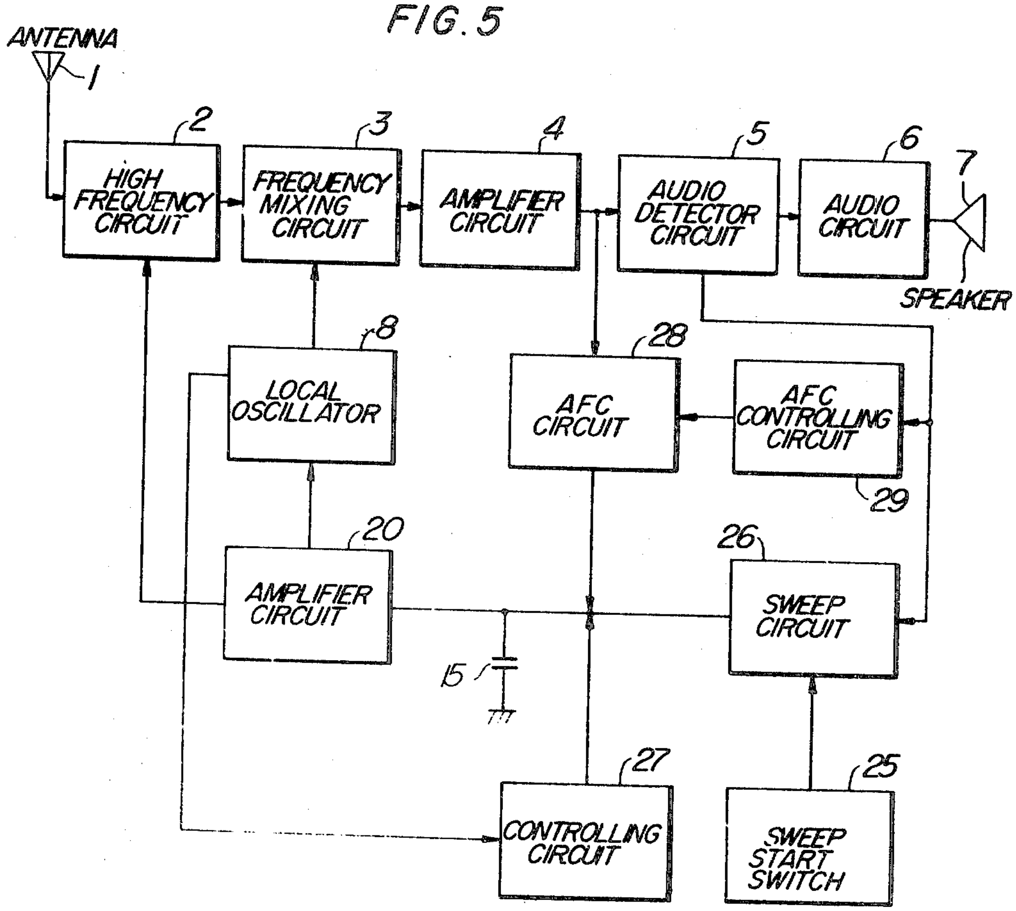

FIG. 5 shows a fourth embodiment of the present invention. In FIG. 5, elements indicated by 1 to 8, 15 and 20 are similar to those indicated by 1 to 8, 15 and 20 in FIG. 1, and therefore description thereof will be omitted. The reference numeral 25 represents a sweep start switch, and 26 a sweep circuit which is so designed as to cause the voltage of capacitor 15 to be swept in any direction, either the charging or discharging direction, in accordance with the instruction by the sweep start switch 25 and stop the sweep in accordance with the instruction from the receiving circuit to the effect that a signal is tuned in. The sweep circuit 26 is also designed so that it automatically reverses the sweep when the voltage across the capacitor 15 reaches a level corresponding to the upper or lower limit of the reception range.

The reference numeral 27 denotes a tuned frequency-locking control circuit supplying to the capacitor 15 such a control output as to correct variations of the local oscillation frequency by comparing the local oscillation frequency with a higher harmonic of a self-contained fixed basic frequency oscillator to thereby prevent each tuning constant from being changed after the sweep is stopped. The reference numeral 28 indicates an AFC circuit for which the intermediate frequency output of the receiving circuit serves as driving source. The AFC circuit 28 is controlled by an AFC-controlling circuit 29 so that it operates upon cessation of the sweep and stops functioning after a predetermined period of time. The AFC-controlling circuit 29 is provided to control the operation of the AFC circuit 28 and so designed as to transmit driving pulses for a predetermined period of time to enable the AFC circuit 28 to be operated with a signal to stop the operation of the sweep circuit 26 which is detected by the receiving circuit. The AFC-controlling circuit 29 may be constituted either by a monostable multivibrator or an amplifier circuit with a combination of constant CR time constants. (The same effect can be obtained by designing the AFC-controlling circuit 29 so that it gates the output of the AFC circuit 28 for a predetermined period of time.)

More specifically, the AFC control provided by the intermediate frequency output of the receiving circuit is effected only for a short period of time to enable the receiving circuit to be tuned to a signal, and upon cessation of the sweep, the correction-control with respect to the tuning constants is remarkably effected. Soon after completion of the correction-control, the AFC control is interrupted so that the tuned frequency-locking control is predominantly effected. The drawback which may occur when the AFC control is interrupted is that the tuned frequency-locking control would possibly be effected again at a position slightly deviated from the tuning point concurrently with the cessation of the AFC control if the control frequency interval of the tuned frequency-locking control is too great and such control signal does not exactly corresponds to the tuning position for the transmissive signal. However, this can be eliminated by sufficiently adjusting the fixed basic oscillator in the tuned frequency-locking control circuit 27 or increasing the stability of the oscillation. If this is felt troublesome, then the above drawback can easily be removed by lowering the oscillation frequency of the fixed basic oscillator to thereby recuse the control frequency interval. For a high-quality signal wave, the AFC control maintains the receiving circuit in the optimum state even if the tuned frequency-locking control is very coarse, while for periodic noise stronger than the signal wave, it works in the detuning direction, although rarely.

Figure 6:
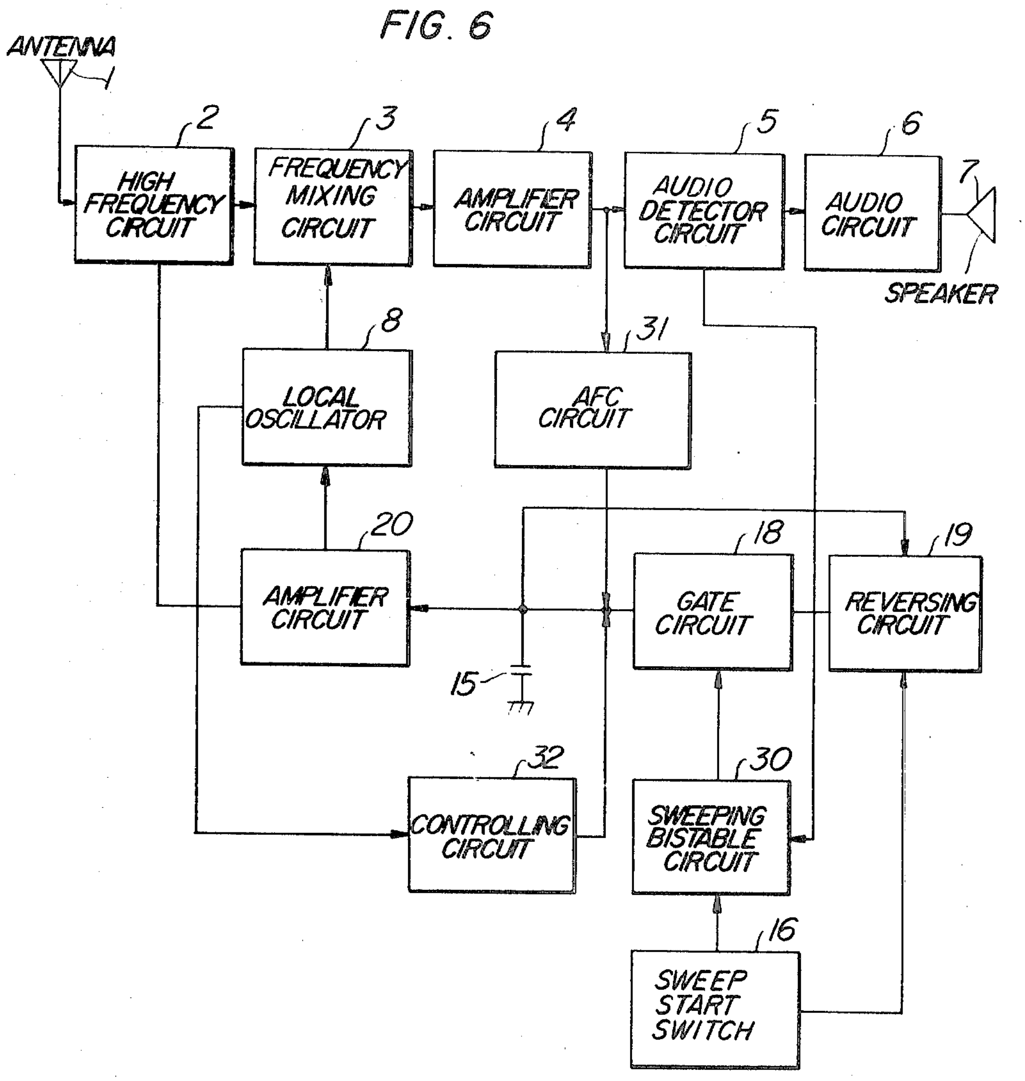

Referring to FIG. 6, there is shown a fifth embodiment of the present invention. In FIG. 6, elements indicated by 1 to 8 and 15, 16, 18, 19 and 20 are similar to those indicated by 1 to 8 and 15, 16, 18, 19 and 20 in FIG. 1, and therefore description thereof will be omitted. The reference numeral 30 represents a sweeping bistable circuit which is so designed that it is set to the sweeping state in accordance with the instruction from the sweep start switch 16 to thereby open the gate circuit 18 and reversed to the nonsweeping state by a tuning detection signal from the receiving circuit to thereby close the gate circuit 18.

The reference numeral 31 indicates an AFC circuit with the control center value thereof being in register with the center of the intermediate frequency. The AFC circuit 31 supplies a control output to the capacitor 15 to maintain each tuning constant of the receiver at the optimum value during reception of a signal, nd it provides no control output when the received signal vanishes. The reference numeral 32 denotes a tuning locking control circuit which compares a drift of the oscillation frequency of the local oscillator circuit 8 with a higher harmonic of the internal fixed basic frequency oscillator and supplies a control output to the capacitor 15 to thereby correction-control the said oscillation frequency to a constant value.

Description will now be made of the operation of this embodiment.

The voltage across the capacitor 15 which determines each tuning constant of the receiving circuit is controlled by three outputs such as the control outputs from the tuning locking control circuit 32 and AFC circuit 31 and the sweep output from the automatic sweep-reversing circuit 19. The magnitudes of the control outputs are constituted larger in the named order. The sweep is effected in the presence of the sweep input, irrespective of the control by the tuning locking control circuit 32 and AFC circuit 31. After the sweep is stopped, the AFC control becomes predominantly effective regardless of the control by the tuning locking control circuit 32, and after a receiving signal vanishes, a sufficient tuning locking control output is secured to compensate for variations of the receiving circuit constants with temperature, leakage in various portions of the control circuit and so forth.

That is, the present embodiment is characterized in that the AFC circuit 31 controlled by an intermediate frequency component derived from a received signal is added to the tuning locking control input to thereby control the voltage across the capacitor 15. Description will be made of undesirable phenomena which will occur in the absence of the AFC circuit 31. First of all, the higher harmonics of the fixed basic frequency oscillator in the tuning locking control circuit 32 do not always occur in such a frequency relationship as to enable the receiver to be accurately tuned to a received frequency. This stems from the fact that a slight frequency error of the fixed basic frequency oscillator is multiplied in the harmonic component as the degrees of the harmonic wave on the basis of absolute value.

Furthermore, the control center value of the tuning locking control circuit 32 may be deviated from the theoretical value depending upon method or due to unbalance of the characteristics of elements in use of the like. Still furthermore, the actual tuned frequency depends upon the leakage from the capacitor 15 to the environmental circuits, or more generically the balance point between the tuning locking control force and the leakage force. However, those problems can be substantially solved by the strong controlling force of the AFC circuit 31. There is a tendency that the tuned frequency which is locked in through the tuning locking control immediately after the sweep is stopped by a tuning detection signal is deviated from a desired control frequency by an amount corresponding to the locking control interval when the input signal is extremely strong. The addition of the AFC circuit 31 to avoid this constitutes an advantage that a great intermediate frequency output is produced at the initial tuning stage since AGC is not yet effective at that stage so that correction-control is effected by a strong controlling force.

Figure 7:
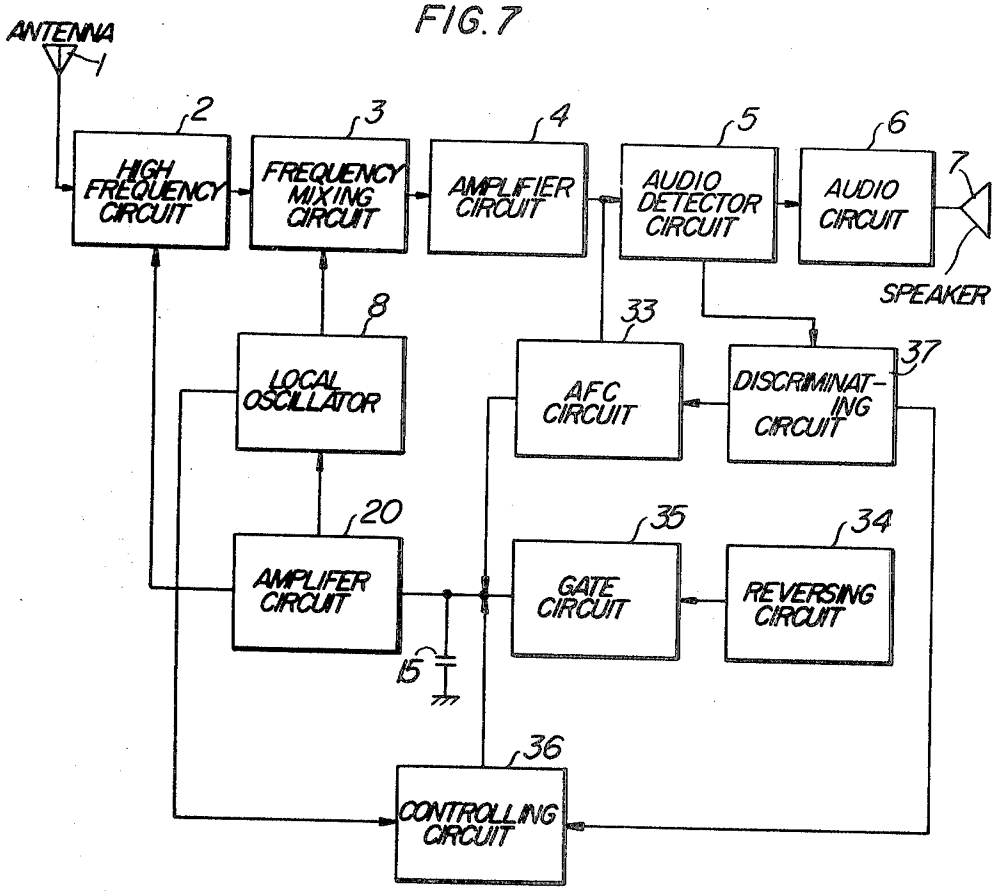

FIG. 7 shows a sixth embodiment of the present invention. In FIG. 7, elements indicated by 1 to 8, 15 and 20 are similar to those indicated by 1 to 8, 15 and 20 in FIG. 1, and therefore description thereof will be omitted. The reference numeral 33 represents an AFC circuit, and 34 an automatic sweep-reversing circuit which is so designed that it supplies an output to the capacitor 15 in opposite polarity during the charge and discharge of the capacitor respectively, that it is automatically reversed in operation at the upper and lower limits of the voltage charged at the capacitor 15, and that it can be set to any desired state by means of the sweep start switch.

The reference numeral 35 indicates a gate circuit for introducing the output of the automatic sweep-reversing circuit 34 to the capacitor 15 and which is so designed that it is opened by the sweep switch and closed upon arrival of a received signal.

The reference numeral 36 denotes a tuning locking control circuit which compares a drift of the oscillation frequency of the local oscillator circuit 8 with a higher harmonic of the internal fixed basic frequency oscillator and supplies a control output to the capacitor 15 to thereby correction-control the oscillation frequency to a constant value, and 37 a field intensity discriminating bistable circuit to which an AGC voltage is applied as input and which assumes two different states depending upon the input to thereby distinguish between the case where the field is sufficient and the case where it is insufficient.

Description will be made of the operation of the present embodiment. In the presence of a sweep input, the sweep is effected regardless of the outputs of the tuning locking control circuit 36 and AFC circuit 33 though the charge stored in the capacitor 15 is controlled by the three controlling forces such as sweep-controlling force, AFC-controlling force and tuned frequency-locking controlling force. Further, design is made such that after the sweep is ceased, the AFC becomes predominantly effective irrespective of the output of the tuning locking control circuit 36, and that after the receiving signal vanishes, sufficient tuning locking control output is secured to compensate for variations in the receiving circuit constants with temperature, leakage in various portions in the control circuits and the like.

In general, it is only required that the ratio of the three controlling forces by made sufficiently strong to present the former controlling force from being hindered by the latter controlling force. However, this not necessarily perfect under some condition for use. For example, in case the electric field has vanished so that the tuned state is maintained by the tuned frequency-locking control output, the locking of the tuned frequency is achieved on the assumption that no output is produced by the AFC circuit as a result of the vanishing of the intermediate frequency output, but there is a possibility that a strong noise component sometimes occurs in such a direction as to cause the AFC control to draw the tuned frequency in either direction. This causes the tuned frequency-locking control point to be deviated more than that corresponding to the control interval.

Figure 8:
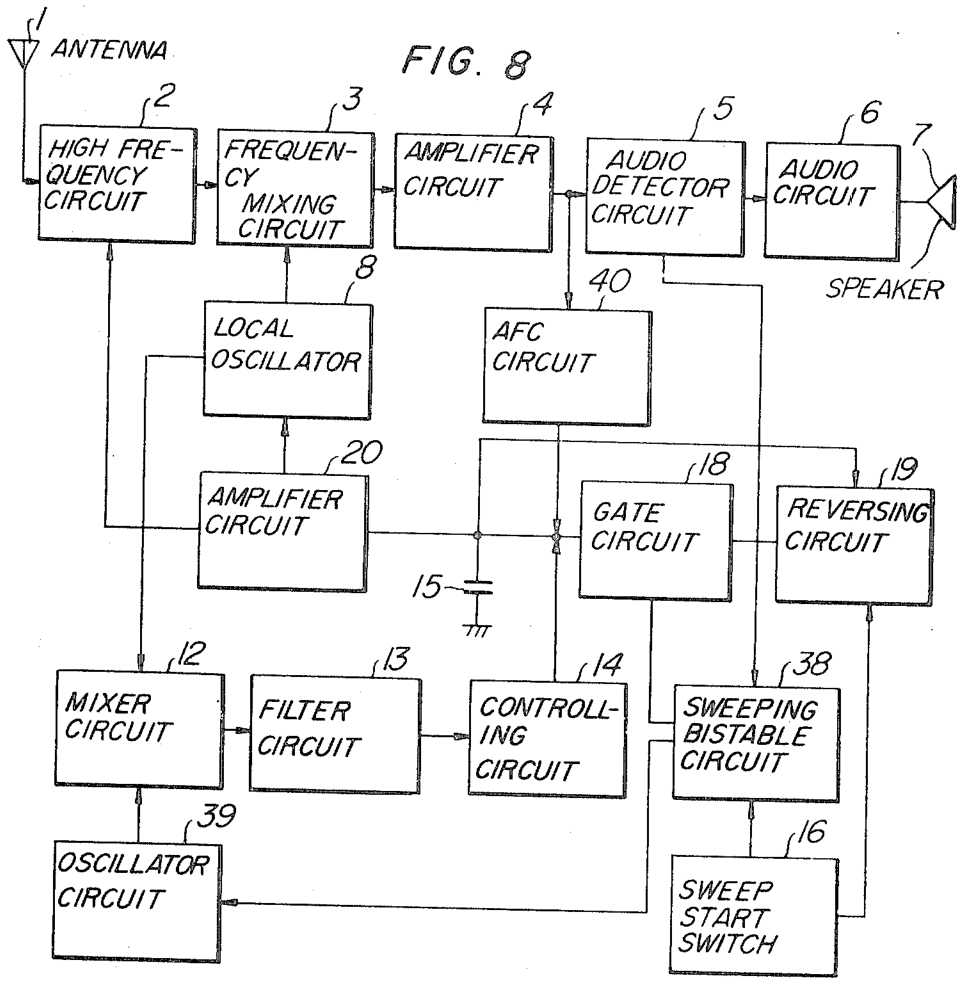

FIG. 8 shows a seventh embodiment of this invention. In FIG. 8, elements indicated by 1 to 8, 12 to 16 and 18 to 20 are similar to those indicated by 1 to 8, 12 to 16 and 18 to 20, and therefore description thereof will be omitted. The reference numeral 38 represents a sweeping bistable circuit which is set to the sweeping state in accordance with the instruction by the sweep start switch 16 to thereby open the gate circuit 18 and reversed to the nonsweeping state by a tuning detection signal from the receiving circuit to thereby close the gate circuit 18. The reference numeral 39 denotes a reference-frequency oscillator circuit comprising a fixed basic-frequency oscillator and a harmonic generator circuit. The reference-frequency oscillator circuit 39 is designed so that it stops oscillation when the sweeping bistable circuit is in the sweeping state while it normally produces oscillation when the sweeping bistable circuit is in the nonsweeping state. The reference numeral 40 indicates an AFC circuit for which the intermediate frequency output of the receiving circuit serves as driving source.

Description will now be made of the operation of this embodiment.

As the frequency control signal source, use is made of three controls, namely, the sweep control, AFC control utilizing the intermediate frequency output of the receiving circuit as driving source and tuned frequency-locking control, and the frequency-controlling force is changed in accordance with the three states of the receiver such as the state during the frequency sweep, that immediately after the tuning and that during the reception. During the frequency sweep, the sweep control is effected; in the state immediately after the tuning, the AFC control utilizing the intermediate frequency output as driving source is effected; and thereafter the tuned frequency-locking control is predominantly effected. The AFC control may be completely eliminated or it may be left as auxiliary controlling force in the third state. This can be freely selected. Such function can be achieved by controlling the reference-frequency oscillator circuit 39 in such a manner as to stop the latter from producing oscillation during the sweeping operation by the output of the sweeping bistable circuit 38 which assumes two different states depending upon field intensity. There occurs no tuned frequency-locking controlling force during a period of time required for the riseup of the oscillation after the sweep has been stopped, so that the AFC control is effected using as driving source a high intermediate frequency output of the receiving circuit which occurs immediately after the tuning and which is not influenced by the AGC control, thereby maintaining an accurate tuned frequency. Thereafter, the tuned frequency-locking control is exclusively effected.

Figure 10:
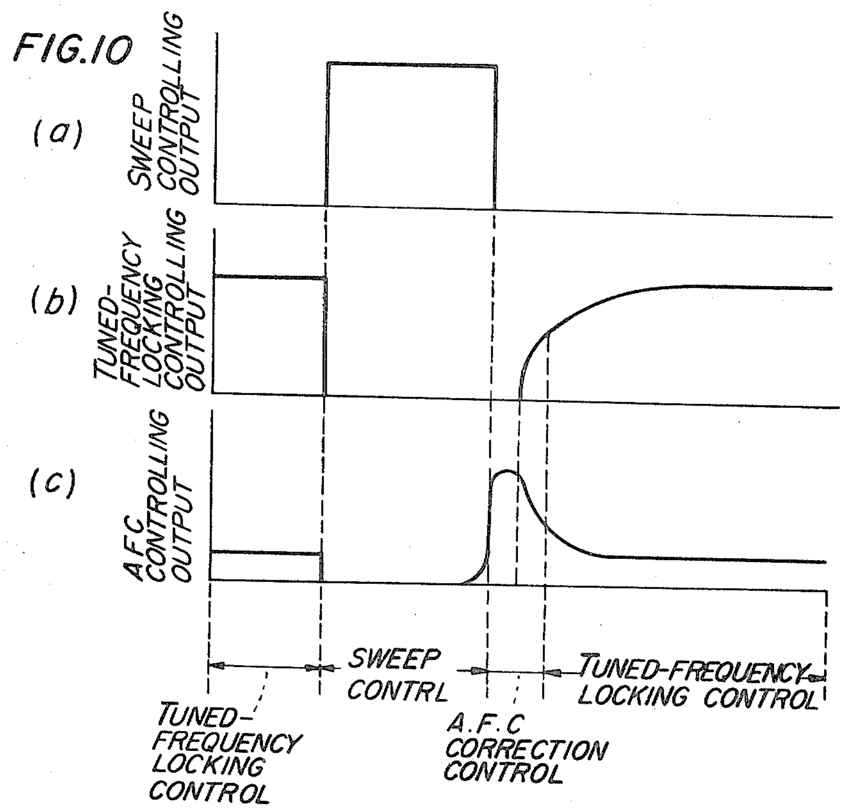
FIG. 10 is a waveform view showing operations occurring at various positions in FIGS 8 and 9.

In fact, immediately after the signal selection there occurs neither the sweep controlling force nor the tuned frequency-locking controlling force. Therefore, no special sever limitation is imposed upon the magnitude of the AFC-controlling force. This is shown in FIG. 10, wherein the sweep control output is shown at (*a*) and the tuning locking control at (*b*). Thus, during the reception, the tuned state is maintained by a strong tuned frequency-locking controlling force irrespective of the intensity of the electric field. The AFC control output may be kept to a certain degree to produce an auxiliary function, if desired.

The tuned frequency-locking controlling force is made to vanish concurrently with the sweep by he fact that the oscillation of the reference-frequency oscillator circuit 39 is stopped, and it gradually recovers in a certain period of time after the sweep has been stopped. FIG. 10*c* shows the AFC-controlling force. During the reception, there occurs a slight control output. In this case, the tuning holding control output may be auxiliary. During the sweep, the controlling force completely vanishes due to the fact that input signal vanishes. Upon cessation of the sweep, a strong tuning control is effected. Then, the controlling force can be selected so that it is reduced or vanished by the AGC control.

Figure 11:
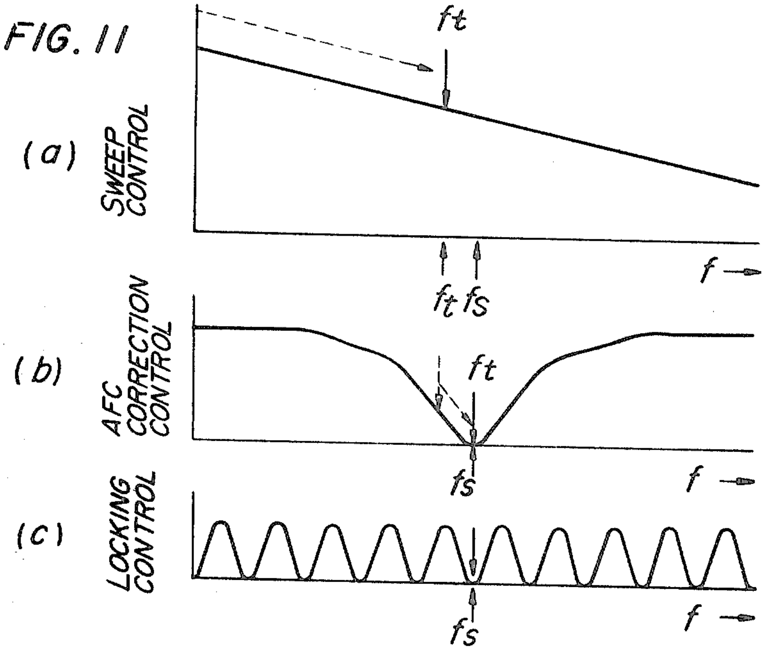
FIG. 11 is a view showing the frequency-potential characteristics.

FIG. 11 shows the frequency potentials for the cases of sweep control, AFC control and tuned frequency-locking control. That is, FIG. 11*a* illustrates the manner in which the frequency $f_T$ tuned by the receiving circuit is swept toward the higher frequency along the potential slope during the sweeping operation; FIG. 11*b* shows the correction-control for the tuning which is effected by the AFC control so that the tuned frequency $f_T$ is absorbed toward the input signal frequency $f_s$ when the sweep is stopped at $f_T$ which is slightly lower than $f_s$; and FIG. 11*c* shows the manner in which the AFC-controlling force is reduced and the tuned frequency-locking control becomes predominant so that the tuned frequency $f_t$ is pushed into a narrow potential valley so as to be immobile.

In case potential valley is slightly out of agreement with the input signal $f_s$ during the tuned frequency-locking control, the configuration of the potential valley in near around of the signal $f_s$ occurring during tuned frequency-locking control is slightly modified by leaving more AFC-controlling force, so that the bottom of the valley is brought into agreement with $f_s$.

Figure 9:
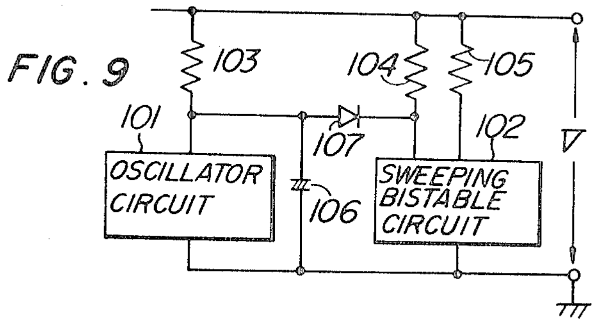
FIG. 9 is a circuit diagram showing the main portion of the FIG. 8 device.

FIG. 9 shows a method of assembling a circuit arrangement which is capable of producing the foregoing function.

Referring to FIG. 9, the reference numeral 101 represents a reference-frequency oscillator circuit, 102 a sweeping bistable circuit, 103 a resistor, and 106 a capacitor which constitutes a power source filter together with the resistor 103. The reference numerals 104 and 105 indicate resistors which are load resistors for the bistable circuit 102, and 107 a diode.

Description will be made of the operation of the circuit. Design is made such that a current flows through the resistor 104 of the bistable circuit 102 during the sweep while no current flows therethrough during the nonsweep. Thus, during the sweep, the output terminal connected with the resistor 104 of the bistable circuit 102 assumes the earth level so that the charge at the capacitor 106 is discharged through the diode 107 to make the power source input terminal of the reference-frequency oscillator circuit close to the earth level. Thus, the oscillation of the reference-frequency oscillator circuit is stopped.

Upon reversal of the bistable circuit 102 to the nonsweeping state, the current is stopped from flowing through the resistor 104 so that the diode 107 is rendered nonconductive. Thus, the voltage across the capacitor 106 begins recovering. When the voltage recovers to a certain degree, the oscillation of the reference-frequency oscillator circuit is initiated, gradually approaching a steady amplitude. This process is reproduced as the tuned frequency-locking control as shown in FIG. 10(*b*). The tuned frequency-locking control signal may be cut off not only during the sweep but also until a certain point of time after the sweep has been stopped.

FIG. 12 shows an eighth embodiment of the present invention. In FIG. 12, elements indicated by 1 to 8, 11, 12 and 16 to 20 are similar to those indicated by 1 to 8, 11, 12 and 16 to 20 in FIG. 1, and therefore description thereof will be omitted. Referring to FIG. 12, the reference numeral 41 represents a frequency discriminator circuit of which the center value corresponds to the intermediate frequency, 42 a tuning control circuit adapted to provide tuned frequency-locking control and tuning correction-control which is effected during signal selection. The circuit 42 is driven by the outputs of the fixed band-pass filter 13 and frequency discriminator circuit 41 to control the charges at the capacitor 15.

FIG. 13 shows an example of combination of the fixed band-pass filter 13, frequency discriminator circuit 41 and tuning control circuit 42 as shown in FIG. 12. Referring to FIG. 13, the reference numeral 43 represents a control transistor, 44 and 45 collector and emitter resistors for the transistor respectively, 46 a high-frequency bypass capacitor, and 47 a resistor forming a charge-discharging time constant together with the capacitor 15.

The operation will be described below.

Assume that the center frequency of the fixed band-pass filter 13 is $f_B$. If the oscillation frequency $f_{LO}$ of the local oscillator is changed to such a value that the beat between it and the frequency of the output of the reference-frequency oscillator circuit 11 becomes $f_B$, then the output of the filter 13 is applied between the base and the emitter of the control transistor 43 through capacitor connected between output terminals A and B of the frequency discriminator circuit 41. As the output of the filter 13 increases, the control transistor 43 is rendered conductive so that the collector voltage thereof is made to approach the earth level by means of the voltage drop across the collector resistor 44 and harmonic component eliminating action of the capacitor 46. Thus, the charges at the capacitor 15 are discharged through the resistor 47.

When the output of the filter 13 decreases, the control transistor 43 is rendered nonconductive so that the collector potential thereof increases to charge the capacitor 15. The frequency discriminator circuit 41 to which the intermediate frequency $f_{IF}$ of the receiving circuit is imparted as input detects tuning deviation during the reception and supplies a DC output for correction-control of such deviation to the transistor 43 through a coil of the filter 13.

Thus, during the reception, the transistor 43 continuously effects correction-control with respect to the tuning with the aid of an input from the frequency discriminator circuit 41 which is stronger than a tuning locking signal supplied to the transistor through the filter 13. when the received signal vanishes, the output of the frequency discriminator circuit 41 simultaneously becomes extinct, so that only the tuning locking control is effected regardless of the presence of the frequency discriminator circuit 41.

FIG. 14 shows the collector potential (output) of the control transistor 43 which occurs during the frequency sweep, wherein the local oscillator frequency is indicated on the horizontal axis which may be considered as time axis during a uniform sweep.

In FIG. 14*a*, the solid line $V_a$ indicates an output which occurs when there is a locking signal in the absence of a received signal, and the broken line ($V_b$) indicates an output which occurs when there is a received signal in the absence of a locking signal. In actuality, such an output as indicated by $V_c$ in FIG. 14*b* will occur when a received signal appears at a point $f_c$ in FIG. 14*b*. If sweep cessation is effected within $\pm\Delta f$, then the tuning will be positively drawn to the point $f_c$. Variations of $V_a$ with variations of $f_{LO}$ are as follows: The oscillation frequency of the reference-frequency oscillator circuit 11 is represented by $$\sum_{n=1}^{\infty} n\times f_0$$

on the assumption that the oscillation frequency of the internal fixed basic frequency oscillator is $f_0$. Thus, it is $$\left|f_{LO}-\sum_{n=1}^{\infty} n\times f_0\right|=f_B$$

that a beat between $f_{LO}$ and $$\sum_{n=1}^{\infty} n\times f_0$$

assumes a frequency of $f_B$. From this, it will be seen that a beat signal having a frequency of $f_B$ can be detected twice at every other $f_o$ as $f_{LO}$ changes. Therefore, in the case of $V_a$ in FIG. 14*a*, the tuning locking frequency can be arranged at any desired interval by suitably selecting $f_o$. As described earlier, in the embodiments as shown in FIGS. 1 to 11, the tuning holding control and tuning correction (or AFC control) were effected by separate control transistors, and the outputs of the transistors were supplied to the transistor through separate routes. In accordance with the present embodiment, however, those controls can be achieved by a single control transistor, so that the number of parts can be greatly reduced. In addition, troublesome adjustment step for the AFC-controlling circuit can be advantageously omitted.

Referring to FIG. 15, there is shown an embodiment of this invention wherein elements indicated by 1 to 8, 11 to 13 and 15 to 20 are similar to those indicated by 1 to 8, 11 to 13 and 15 to 20 in FIG. 1. Therefore, description of those elements will be omitted. The reference numeral 48 represents a preamplifier, 49 a frequency discriminator of which the center frequency corresponds to the intermediate frequency, and 50 a tuning control circuit which is adapted to provide tuned frequency-locking control and tuning correction control which is effected during signal selection. The tuning control circuit 50 is driven by the outputs of the fixed band-pass filter 13 and frequency discriminator circuit 49 so as to control the voltage across the capacitor 15 when no sweep is effected. The reference numeral 51 indicates a resistor, and 52 a diode through which the output of the sweeping bistable circuit 17 is supplied to the preamplifier 48 to thereby control the magnitude of the input to the frequency discriminator 49.

FIG. 16 shows the sweeping bistable circuit 17, preamplifier 48, frequency discriminator 49, resistor 51 and diode 52 as shown in FIG. 15. In the preamplifier 48, the reference numeral 53 represents a coupling capacitor through which an intermediate frequency input $V_{in}$ is supplied to the base of transistor 56, 54 and 55 base bias resistors for the transistor 56, 57 an emitter resistor of the transistor 56, 58 a bypass capacitor, 59 a capacitor the voltage across which controls the intermediate frequency signal supplied to the frequency discriminator circuit 49 and hence the output $V_d$ of the frequency discriminator circuit 49.

The operation will be described below. The sweeping bistable circuit 17 is so controlled from signal input terminals $S_1$ and $S_2$ that when the sweep is effected, the transistor B is rendered conductive while the transistor A is rendered nonconductive, and that when no sweep is effected, the transistor A is rendered conductive while the transistor B is rendered nonconductive.

Upon initiation of the sweep, the transistor B is turned on so that the collector potential thereof decreases. Thus, a current flows to the ground through the resistor 55—resistor 54—resistor 51—diode 52— transistor B—the emitter resistor common to the transistors A and B. In this case, the sum of the resistance values of the resistors 55 and 54 is made considerably greater than the total resistance of the other series-connected resistors so that the capacitor 59 is charged substantially at the earth level. Thus, it may be presumed that the preamplifier represents improved amplification characteristics since it is provided with a proper base bias. The resistor 51 is inserted for the purpose of reducing the load for the sweeping bistable circuit 17 by establishing a certain time constant when the capacitor 59 is charged.

During the sweeping operation, the intermediate frequency input $V_{in}$ is 0, and hence the output $V_{out}$ of the preamplifier 48 is also 0, since there is no received signal. When a transmissive signal is received by the receiving circuit, the sweeping bistable circuit 17 is reversed so that the sweep is interrupted.

At this point, the collector potential of the transistor B is increased substantially to the positive power source potential to render the diode 52 nonconductive. Thus, the potential at the capacitor 59 begins to be discharged with a time constant of $C_7(R_2+\alpha_3)$ and then it is completely discharged, where $C_7$ is the capacitance of the capacitor 59 and $R_2$ and $R_3$ are the resistance values of the resistors 55 and 54 respectively.

The base bias of the transistor 56 may be considered substantially proportional to the voltage charged at the capacitor 59, as shown in FIG. 17*a*. The curve of FIG. 17*a* may also be regarded as the gain characteristic of the preamplifier 48.

The intermediate frequency input $V_{in}$ may be considered to vary with time as shown in FIG. 17*b*, in view of the gain characteristic of the receiving circuit resulting from AGC. That is, the input $V_{in}$ becomes maximum at a point of time when a desired signal is selected, and thereafter it gradually comes to assume a constant value. Thus, the output $V_{out}$ of the preamplifier 48 follows such a curve as shown in FIG. 17*c* and becomes completely zero.

Explanation will be made again in connection with FIG. 15. The tuned frequency-locking control signal which is supplied from the fixed band-pass filter 13 to the tuning control circuit 50 of a constant intensity, whereas the tuning correction control signal from the frequency discriminator circuit 49 assumes the maximum value which is much greater than the tuned frequency-locking control signal at the time when signal selection is effected, and in a short period of time, it vanishes.

With the above arrangement, upon completion of the signal selection, the receiving circuit is correction-controlled to be drawn to the perfect tuning point even if the signal selection trigger signal is somewhat inaccurate in terms of time, and thereafter the correction-controlling force vanishes in a short period of time. Thus, the locking of tuning can be completely achieved without being prevented by any noise mixed in the intermediate frequency signal, whether the received signal is present or sent.

It is not always required that the gain control for the preamplifier 48 be effected in accordance with base bias. Similar effect can also be produced by a similar method of controlling the collector voltage or emitter bias.

With the foregoing arrangement, there is no need to employ relays, transistors or other switching elements for the purpose of switching the tuning correction control to the tuning locking control and vice versa which have been effected in the embodiments of FIGS. 1 to 11. Thus, in accordance with the present invention, an arrangement capable of achieving ideal changeover of controlling forces an be provided.

Figure 18:
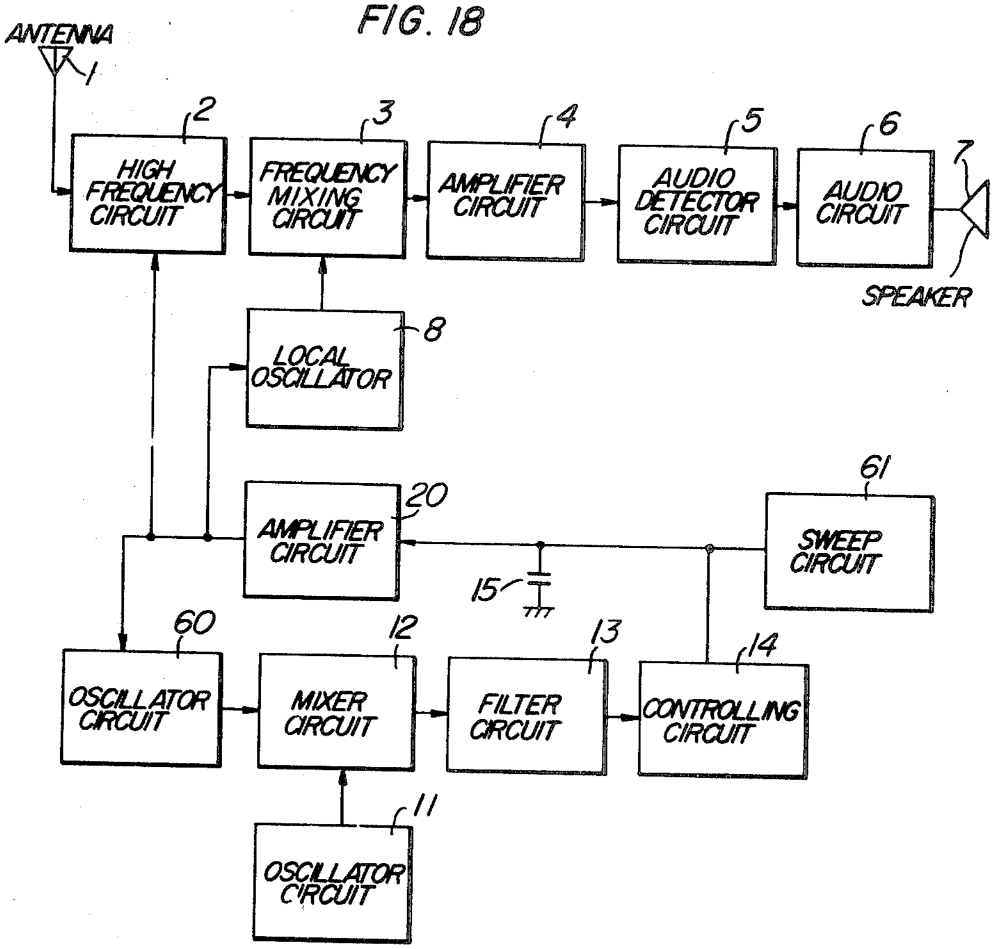

In the embodiment of FIG. 18, elements indicated by 1 to 8 and 11 to 15 are similar to those indicated by 1 to 8 and 11 to 15 in FIG. 1. Therefore, description of those elements will be omitted. The reference numeral 60 represents a comparison-frequency oscillator circuit which oscillates at a frequency proportional to change in the local oscillation frequency, and 61 a sweep circuit which corresponds to the circuit 23 in FIG. 4.

The operation of this embodiment will now be described.

When the sweep start switch is depressed, a sweep input is supplied from the sweep circuit 61 to the capacitor 15 to change the voltage across the capacitor 15. The voltage across the capacitor 15 is applied in the form of current or voltage to the tuning circuits of high frequency circuit 2, local oscillator circuit 8, and a comparison oscillator circuits through the buffer circuit 20.

Thus, the tuned frequency in the receiving circuit gradually changes, and when a transmissive signal is tuned, the sweep input from the sweep circuit 61 is automatically interrupted.

After the sweep has been stopped, the voltage across the capacitor 15 is subjected to active tuned frequency-locking control by the tuning control circuit 14 to thereby maintain accurate tuning constants in each tuning circuit.

At the same time, the voltage across the capacitor 15 is applied in the form of voltage or current to a variable reactance element which is incorporated in the comparison oscillator circuit 60 and which has similar characteristics to those provided in the local oscillator circuit 8 and high frequency circuit 2, thereby controlling the proportional oscillation frequency.

When the voltage across the capacitor 15 changes by $\Delta V_c$ with respect to a constant $\alpha$ determined by a received frequency, the following relation holds in the vicinity of the received frequency $$\frac{\Delta f_{LO}}{\Delta V} \doteqdot \alpha \frac{\Delta f_p}{\Delta V} \text{ or } \Delta f_{LO} = \alpha \Delta f_p$$

where $V_c$ is the voltage across the capacitor 15, $f_{LO}$ is the local oscillator frequency, and $f_p$ is the proportional oscillation frequency.

Furthermore, the following relation holds true with respect to a constant $\beta$ between variations in $f_{LO}$ and $f_p$ with temperature $$\frac{\Delta f_{LO}}{\Delta T} \quad \beta \frac{\Delta f_p}{\Delta T} \text{ or } \Delta f_{LO} = \beta \Delta f_p$$

From the foregoing relationships, it will be seen that $\Delta f_{LO}$ can be reduced to zero through such control as to reduce $\Delta f_p$ to zero.

If the fixed basic oscillation frequency $f_o$ occurring in the reference-frequency oscillator circuit 11 is made sufficiently small then the reference oscillation frequency $f_R$ is given by $$f_R = nf_o (n=1, 2, 3, \ldots)$$

and at the time when the sweep is stopped, at least one of the frequency components $f_r$ makes a beat substantially equal to the center value $f_B$ of the fixed band-pass filter 13 with the proportional oscillation frequency $f_p$ so that a beat output formed by the reference oscillation frequency $f_R$ and proportional oscillation frequency $f_p$ is available from the fixed band-pass filter 13. The tuning control circuit 14 controls the voltage across the capacitor 15 to prevent the beat from being deviated from the center value of the fixed band-pass filter 13, to thereby prevent drift to the proportional oscillation frequency. The above control maintains frequency variation $\Delta f_p$ in the comparison-frequency oscillator circuit 60 at zero so long as no other control value is intentionally imparted to the capacitor 15, so that the drift $\Delta f_{LO}$ of the local oscillation frequency is also maintained at zero. Consequently, all the tuning constants of the receiving circuit are kept constant.

As described above, with the automatic tuning device embodying the present invention, if a received electric field is sufficiently strong during the signal seeking operation, the received frequency can be kept at a constant value irrespective of extinction of the field and lapse of time, a thus the original receiving state can be secured upon rearrival of the desired signal.

Furthermore, there is no possibility that the control is adversely affected by noise, pulses or the like, and therefore stabilized tuning control can be achieved as compared with the prior art arrangement.

Thus, e automatic tuning device according to the present invention is well suited to a car radio set, and it can be further miniaturized and easily manufactured as compared with a device of this type using mechanical tuning means such as tuner.

We claim:

1. An automatic tuning device, comprising, in combination, electrically controlled variable reactance elements provided in tuning circuits, mans mixing the output of a local oscillator containing some of said electrically controlled variable reactance elements, and the output of means providing a plurality of fixed reference oscillation frequencies having a predetermined frequency interval $f_o$ between respective adjacent frequencies, said frequency interval being substantially equal to the interval of received frequencies of said tuning device; means operatively connected to said tuning circuits for fixing the tuning constants of said tuning device, including means controlling the reactance of each of said variable reactance elements and automatic frequency control means maintaining the output frequency of said mixing means at a constant value; wherein said automatic frequency control means controls said tuning constants to lock and fine tune a received frequency by means of a control signal $f_c$ derived from said automatic frequency control means substantially equal to an intermediate frequency $f_{IF}$ derived from said tuning circuits as defined by $f_{IF} \pm f_c = \pm n \times f_o$, where $n$ is an integer.

2. An automatic tuning device comprising, in combination, electrically controlled variable reactance elements provided in tuning circuits; means for mixing the output of a local oscillator containing some of said electrically controlled variable reactance elements and the output of means providing a plurality of fixed reference oscillation frequencies; means operatively connected to said tuning circuits for fixing the tuning constants of said tuning device, including means controlling the reactance of each of said variable reactance elements and automatic frequency control means maintaining the output frequency of said mixing means at a constant value; and a comparison oscillator circuit oscillating at a frequency proportional to variations of the local oscillation frequency of said local oscillator, the output of said comparison oscillator circuit being connected to an input of said mixing means to be mixed therein with said reference oscillation frequencies.

3. An automatic tuning device, comprising, in combination, electrically controlled variable reactance elements provided in tuning circuits; means producing an intermediate frequency; a local oscillator containing some of said electrically controlled variable reactance elements; means generating a plurality of fixed reference oscillation frequencies; means mixing the outputs of said local oscillator and said reference frequency-generating means; means operatively connected to said tuning circuits for fixing the tuning constants of said tuning device, including means controlling the reactance of each of said variable reactance elements and automatic frequency control means maintaining the output frequency of said mixing means at a constant value; means, including a sweep circuit, for sweeping the tuning constants of said variable reactance elements through a predetermined frequency range; an AFC circuit driven by said intermediate frequency; and means connecting said automatic frequency control means, said sweep circuit and said AFC circuit.

4. An automatic tuning device as claimed in claim 3, further comprising a field intensity discriminating circuit operatively connected to said AFC circuit when the field intensity corresponding to a received frequency is higher than a predetermined field intensity and operatively connected to said automatic frequency control means when said field intensity is lower than said predetermined field intensity.

5. An automatic tuning device as defined in claim 3, including means stopping the operation of said automatic control means when said sweep circuit is operative.

6. An automatic tuning device as claimed in claim 5, in which an operational power source is supplied to a fixed basic oscillator in said automatic frequency control means through a resistor, a capacitor is connected across the terminals of said oscillator through which the latter is powered, and said capacitor is discharged during the signal seeking.

7. An automatic tuning device as defined in claim 3, wherein said sweep circuit includes a bistable circuit which assumes a first state when said sweep circuit is operative and a second state when said sweep circuit is inoperative; said AFC circuit having a frequency discriminator and a preamplifier, the output of said bistable circuit being applied to said preamplifier as a bias with an optional time constant wherein the gain of said preamplifier and the output of said frequency discriminator are adjusted in a predetermined period of time after said sweep operation is stopped.

8. A stabilized automatic tuning receiver capable of maintaining the tuned frequency of a broadcast signal being received irrespective of any fluctuation of the intensity of the signal, comprising:

a. antenna tuning means including an antenna and variable reactance elements, the reactances of which are electronically variable, said tuning means receiving an input signal at a frequency corresponding to a tuned signal introduced by said variable reactance elements;

b. RF tuned amplifying means including variable reactance elements, the reactances of which are electronically variable, said amplifying means receiving and amplifying the output of said antenna tuning means, which output corresponds to a tuned signal introduced by the variable reactance elements of said amplifying means;

c. local oscillator means including variable reactance elements, the reactances of which are electronically variable, said oscillator means delivering a local oscillator output corresponding to a tuned signal introduced by the variable reactance elements of said local oscillator means;

d. mixing means for mixing the outputs of said RF tuned amplifying means and said local oscillator means to produce an IF signal; e. IF-amplifying means for band-amplifying said IF signal;

f. AF detector means for producing an AF signal responsive to the output of said IF-amplifying means;

g. AF-amplifying means for amplifying the output of said AF detector means and actuating a speaker by the resulting AF signal;

h. IF-amplifying and detecting means including a narrow band-pass filter having a pass band identical with the frequency of said IF signal, said means amplifying a portion of the output of said IF-amplifying means through said filter;

i. reference signal frequency generating means including a reference signal ($f_o$) generating circuit and a higher harmonics generating circuit for generating higher harmonics ($nf_o$ where $n=1, 2, \ldots$) of said reference signal;

j. mixer means for mixing the outputs of said local oscillator means and said reference signal-generating means;

k. band amplifying and detecting means for amplifying a signal having a frequency of $f_f=(n\pm\frac{1}{2})\ f_o$ fed from said mixer means;

l. capacitance means chargeable to a voltage for determining the reactances of the variable reactance elements of said antenna tuning means, said RF tuned amplifying means and said local oscillator means;

m. AFC means for controlling said capacitance means to maintain the tuned frequency constant by means of the output of said band amplifying and detecting means;

n. amplifying means for amplifying and converting the voltage of said capacitance means into a tuning control signal;

o. starting switch means including a charging sweep start switch and a discharging sweep start switch charging and discharging said capacitance means upon actuation of the starting switch means;

p. a sweeping bistable circuit set by said start switch means and reset by said band amplifying and detecting means;

q. automatic sweep-reversing means for establishing the mode of operation of said capacitance means for one of the charging and discharging actions, and, when a signal corresponding to the terminal voltage of said capacitance means reaches one of predetermined upper and lower limits, reversing said mode of operation of said capacitance means; and r. sweep gate means provided in circuit between said automatic sweep-reversing means and said capacitance means and controlled by said sweeping bistable circuit.

9. A stabilized automatic tuning receiver as defined in claim 8, wherein an audio detector circuit is provided for resetting said sweeping bistable circuit and said band amplifying and detecting means comprises an AFC-controlling circuit operating for a predetermined time responsive to the output of said audio detector circuit and an AFC circuit for correcting the voltage of said capacitance means by means of a control signal obtained by amplifying, frequency discriminating and DC amplifying a portion of the output of said IF-amplifying means while said AFC-controlling circuit is operating.